US012702960B2

(12) United States Patent
Todorova et al.

(10) Patent No.: US 12,702,960 B2
(45) Date of Patent: Aug. 11, 2026

(54) INSTALLATION AND METHOD FOR DISTRIBUTING A GAS MIXTURE

(71) Applicant: Air Liquide Electronics Systems, Paris (FR)

(72) Inventors: Vanina Todorova, Crolles (FR); Herve Dulphy, Jarrie (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 874 days.

(21) Appl. No.: 18/008,365

(22) PCT Filed: May 31, 2021

(86) PCT No.: PCT/EP2021/064478
§ 371 (c)(1),
(2) Date: Dec. 5, 2022

(87) PCT Pub. No.: WO2021/245000
PCT Pub. Date: Dec. 9, 2021

(65) Prior Publication Data
US 2023/0277993 A1 Sep. 7, 2023

(30) Foreign Application Priority Data
Jun. 5, 2020 (FR) ...................................... 2005922

(51) Int. Cl.
*B01F 35/00* (2022.01)
*B01F 23/10* (2022.01)
(Continued)

(52) U.S. Cl.
CPC .......... *B01F 35/2202* (2022.01); *B01F 23/19* (2022.01); *B01F 25/40* (2022.01);
(Continued)

(58) Field of Classification Search
CPC ........... B01F 35/2202; B01F 35/21112; B01F 35/2113; B01F 23/19; B01F 25/40; G05D 11/132; G05D 11/138
See application file for complete search history.

(56) References Cited

U.S. PATENT DOCUMENTS 6,105,631 A 8/2000 Pittroff et al.
2006/0263283 A1* 11/2006 Egan ...................... B01F 23/19 423/210
(Continued)

FOREIGN PATENT DOCUMENTS

EP 0 623 381 11/1994
FR 2 631 856 12/1989
(Continued)

OTHER PUBLICATIONS

KR 20090118428 Machine Translation (Year: 2009).*
International Search Report for corresponding PCT/EP2021/064478, Sep. 8, 2021.

*Primary Examiner* — Anshu Bhatia
(74) *Attorney, Agent, or Firm* — Elwood L. Haynes

(57) ABSTRACT

A plant for delivering a gas mixture including a source of a first gas, a source of a second gas, a mixer device fluidically connected to the source of first gas and to the source of second gas. A first flow regulator member and a second flow regulator member, a control unit, a buffer tank, at least one measurement sensor configured to measure a physical quantity, the variation of which is representative of a variation in the consumption flow rate delivered by the delivery line and to provide a first measurement signal of said physical quantity.

15 Claims, 3 Drawing Sheets

(51) Int. Cl.

| | |
|---|---|
| ***B01F 25/40*** | (2022.01) |
| ***B01F 35/21*** | (2022.01) |
| ***B01F 35/22*** | (2022.01) |
| ***B01F 35/221*** | (2022.01) |
| ***G05D 11/13*** | (2006.01) |

(52) U.S. Cl.

CPC ..... *B01F 35/21112* (2022.01); *B01F 35/2113* (2022.01); *B01F 35/2211* (2022.01); *G05D 11/132* (2013.01); *G05D 11/138* (2013.01)

(56) References Cited

U.S. PATENT DOCUMENTS

| | | | | |
|---|---|---|---|---|
| 2008/0165613 | A1 * | 7/2008 | Dykstra | G05D 11/135 700/285 |
| 2010/0224264 | A1 * | 9/2010 | Homan | H01L 21/2225 137/602 |
| 2011/0290371 | A1 | 12/2011 | Barbier et al. | |

FOREIGN PATENT DOCUMENTS

| | | | | |
|---|---|---|---|---|
| JP | 2000 235952 | | 8/2000 | |
| JP | 2001 259400 | | 9/2001 | |
| JP | 2014 093497 | | 5/2014 | |
| KR | 2009 0118428 | | 11/2009 | |
| KR | 20090118428 | A * | 11/2009 | H01L 21/67017 |
| WO | WO 2010 031940 | | 3/2010 | |

* cited by examiner

INSTALLATION AND METHOD FOR DISTRIBUTING A GAS MIXTURE

CROSS REFERENCE TO RELATED APPLICATIONS

This application is a 371 of International Application No. PCT/EP2021/064478, filed May 31, 2021, which claims priority to French Patent Application No. 2005922, filed Jun. 5, 2020, the entire contents of which are incorporated herein by reference.

BACKGROUND

The present invention relates to a plant for delivering a gas mixture intended to be used by a gas-consuming unit. The plant enables the mixture to be delivered directly to the site of use and also an adjustment of the flow rate of mixture produced by the plant as a function of the flow consumed by the consuming unit The invention also relates to a process for delivering a mixture using such a plant.

In particular, a plant and a process according to the invention are intended to deliver mixtures of pure gas or gas pre-mixtures, in particular to deliver mixtures of gases extracted from the air, such as nitrogen, argon, oxygen, helium, hydrogen, hydrocarbons such as propane.

Note that the expression “gas-consuming unit” may extend both to a single consuming unit and to several entities supplied in parallel by the gas mixture, in particular several entities arranged downstream of a branch box.

Usually, the gas mixtures are packaged in compressed or liquefied form in gas cylinders. The filling of a gas cylinder is carried out in sequential mode, the constituents of the mixture being introduced one after the other into the cylinder. For each constituent, a check on the amount of gas introduced into the cylinder is carried out, either by monitoring the pressure in the cylinder during and after the introduction of the constituent, or by weighing the cylinder during the introduction of the constituent. Such a plant for packaging gas mixtures is in particular described in document WO 2010/031940 A1.

In order to guarantee to the user the reliability and the reproducibility of the performance and/or results provided by the gas-consuming unit, it is necessary to produce gas mixtures that offer great precision over the concentrations of each constituent. Depending on the applications, the maximum tolerance for variation of the actual values of the concentrations relative to the target values may be 10% (relative %), or 5% or even less. The greater the number of constituents and/or the lower the contents thereof, the more difficult it is to meet such tolerances.

Depending on the required accuracy, the current packaging methods may prove insufficient. In particular, the manometric packaging by control of the pressure offers an accuracy that is intrinsically limited by the accuracy of the pressure sensor and by the variations in temperature which influences the calculation of the amount of gas. Added to the uncertainty regarding the concentration values of the gas mixture produced are the differences in concentration between the mixtures packaged in different cylinders. Such differences may cause the results produced by the consuming unit to vary substantially on each cylinder change.

Gravimetric packaging by weighing the constituents offers greater accuracy regarding the composition of the mixture but still requires a stepwise process with filling of cylinders.

However, the use of cylinders results in a limited autonomy for the user with a stoppage of the delivery that is difficult to predict when the consumption of the gas mixture varies. Since the lead times of the gas mixtures may be relatively long, the user must manage their stock of cylinders in order to ensure continuity of their production.

Furthermore, the filling of cylinders with the mixtures takes place in packaging centres specifically equipped for operations of this type. The cylinders must then be transported to their site of use, which requires dedicated logistics. Constraints linked to the transportation of dangerous goods may also be present when it is a question of transporting mixtures of gases containing flammable, pyrophoric, toxic and/or anoxic constituents.

Furthermore, the operations of connecting/deconnecting the cylinders are tedious for the users and increase the risk of contaminating the gas mixture with ambient air. The cylinders also require a specific preparation before filling including steps of cleaning, passivating, etc.

SUMMARY

The objective of the invention is to overcome all or some of the drawbacks mentioned above, in particular by proposing a plant for delivering a gas mixture which makes it possible to accurately control the composition of the mixture, while offering continuity and flexibility of delivery, in particular as a function of the requirements at the point of consumption of the mixture.

For this purpose, the solution of the present invention is a plant for delivering a gas mixture comprising:

- a source of a first gas,
- a source of a second gas,
- a mixer device fluidically connected to the source of first gas and to the source of second gas, said mixer device being configured to produce, at an outlet, a gas mixture comprising the first gas and the second gas,
- a first flow regulator member and a second flow regulator member which are configured to regulate respectively the flow of the first gas and the flow of the second gas flowing towards the mixer device according to a first flow rate setpoint and a second flow rate setpoint defining, in operation, a production flow rate of the gas mixture at the outlet of the mixer device,
- a control unit configured to control the first and second flow regulator members so as to adjust the first flow rate setpoint and the second flow rate setpoint in respective proportions relative to the production flow rate, said respective proportions being determined as a function of at least one target content of first gas and/or second gas in the gas mixture,
- a buffer tank fluidically connected to the outlet of the mixer device on the one hand and to a delivery line on the other hand, the delivery line being configured to deliver the gas mixture to a consuming unit with a consumption flow rate representative of a variable consumption of the gas mixture,
- at least one measurement sensor configured to measure a physical quantity, the variation of which is representative of a variation in the consumption flow rate delivered by the delivery line and to provide a first measurement signal of said physical quantity, the control unit being connected to the measurement sensor and configured to produce a first control signal from the first measurement signal, the flow regulator members being configured to adjust the first flow rate setpoint and the second flow rate setpoint in response to said first control signal.

Depending on the case, the invention may comprise one or more of the features mentioned below.

The plant comprises a first feedback loop from the first and second flow rate setpoints to the first measurement signal provided by the measurement sensor, said first loop comprising:

- a first comparator arranged within the control unit (5) and configured to produce at least a first error signal from the first measurement signal,
- a first corrector arranged within the control unit, in particular of proportional, integral and derivative type, and configured to produce the first control signal from the first error signal,
- actuators of the first and second flow regulator members which are connected to the first corrector and configured to receive the first control signal and move the first and second flow regulator members into respective positions in which the first flow rate setpoint and the second flow rate setpoint comply with the first control signal.

The measurement sensor comprises a flow sensor or flowmeter configured to measure the consumption flow rate.

The first comparator is configured to produce at least a first error signal representative of a variation in the consumption flow rate and the first corrector is configured to produce a first control signal controlling a movement of the first and second flow regulator members so that the first and second flow rate setpoints vary in the same direction as that of the variation in the flow rate.

The measurement sensor comprises a pressure sensor configured to measure the pressure prevailing in the buffer tank.

The first comparator is configured to produce a first error signal representative of a variation in the pressure in the buffer tank and the first corrector is configured to produce at least a first control signal controlling a movement of the first and second flow regulator members so that the first and second flow rate setpoints vary in the opposite direction to that of the variation in the pressure.

The first comparator is configured to produce at least a first error signal from a comparison of the first measurement signal with at least one parameter chosen from: a low pressure threshold, a high pressure threshold.

Each of the first and second flow regulator members can be moved between a closed position in which the first flow rate setpoint or the second flow rate setpoint is zero and a completely open position in which the first flow rate setpoint or the second flow rate setpoint respectively have a first maximum flow rate value or a second maximum flow rate value, the first and second flow regulator members possibly occupying at least one intermediate position between the closed position and the open position with said intermediate position preferably corresponding to a first flow rate setpoint or a second flow rate setpoint equal to at least 25%, more preferably at least 35%, of its respective first or second maximum value.

The buffer tank has an internal volume equal to at least half of the maximum production flow rate of the plant.

The plant comprises a first analysis unit arranged downstream of the buffer tank and configured to analyse at least one content of first gas and/or second gas in the mixture delivered by the supply line.

The plant comprises a second analysis unit configured to measure at least one content of first gas and/or second gas in the gas mixture produced at the first outlet of the mixer device and to consequently provide at least a second measurement signal, the control unit being connected to the second analysis unit and configured to produce a second control signal from the second measurement signal and to modify the proportion of the first flow rate setpoint and/or the proportion of the second flow rate setpoint relative to the production flow rate in response to said second control signal.

The plant comprises a second feedback loop from the respective proportions of the first flow rate setpoint and/or the second flow rate setpoint relative to the production flow rate to the second measurement signal provided by the second analysis unit, the second loop comprising:

- a second comparator arranged within the control unit and configured to produce at least a second error signal from a comparison of the second measurement signal with at least one parameter chosen from: a target content of the first gas, a target content of the second gas,
- a second corrector arranged within the control unit, in particular of proportional, integral and derivative type, and configured to produce the second control signal from the second error signal,
- actuators of the first and/or second flow regulator members being connected to the second corrector and configured to move the first and/or second flow regulator members into respective positions in which the proportions of the first flow rate setpoint and/or second flow rate setpoint relative to the production flow rate comply with the second control signal.

The control unit comprises a man-machine interface comprising:

- an input interface, in particular a touch screen, configured for the input by a user of at least one target content of the first gas and/or of the second gas in the gas mixture,
- at least one calculation rule in order to calculate, from said target content, the predetermined proportions of first flow rate setpoint and/or second flow rate setpoint relative to the production flow rate.

The plant is located on the site of use of the gas mixture by the consuming unit.

Moreover, the invention relates to a process for delivering a gas mixture comprising the following steps:

a. passing the first gas into a first flow regulator member so as to deliver the first gas with a first flow rate setpoint to a mixer device, b. passing a second gas into a second flow regulator member so as to deliver the second gas with a second flow rate setpoint to the mixer device, c. producing, via an outlet of the mixer device, a gas mixture comprising the first gas and the second gas with a production flow rate, d. adjusting, via control of the first and/or second flow regulator members, the first flow rate setpoint and the second flow rate setpoint in respective proportions relative to the production flow rate, said respective proportions being determined as a function of at least one target content of first gas and/or second gas in the gas mixture, e. introducing, via a buffer tank, the mixture produced in step d) into a delivery line and delivering the gas mixture to a consuming unit with a consumption flow rate representative of a variable consumption of the gas mixture, f. measuring a physical quantity, the variation of which is representative of a variation in the consumption flow rate delivered by the delivery line, g. producing, from the measurement taken in step f), at least a first measurement signal and adjusting, by control of the first and second flow regulator members, the first flow rate setpoint and the second flow rate setpoint as a function of said first measurement signal.

BRIEF DESCRIPTION OF THE DRAWINGS

The invention will now be better understood from the following detailed description, which is provided by way of a non-limiting illustration, with reference to the appended figures described below.

DETAILED DESCRIPTION OF THE PREFERRED EMBODIMENTS

Figure 1:
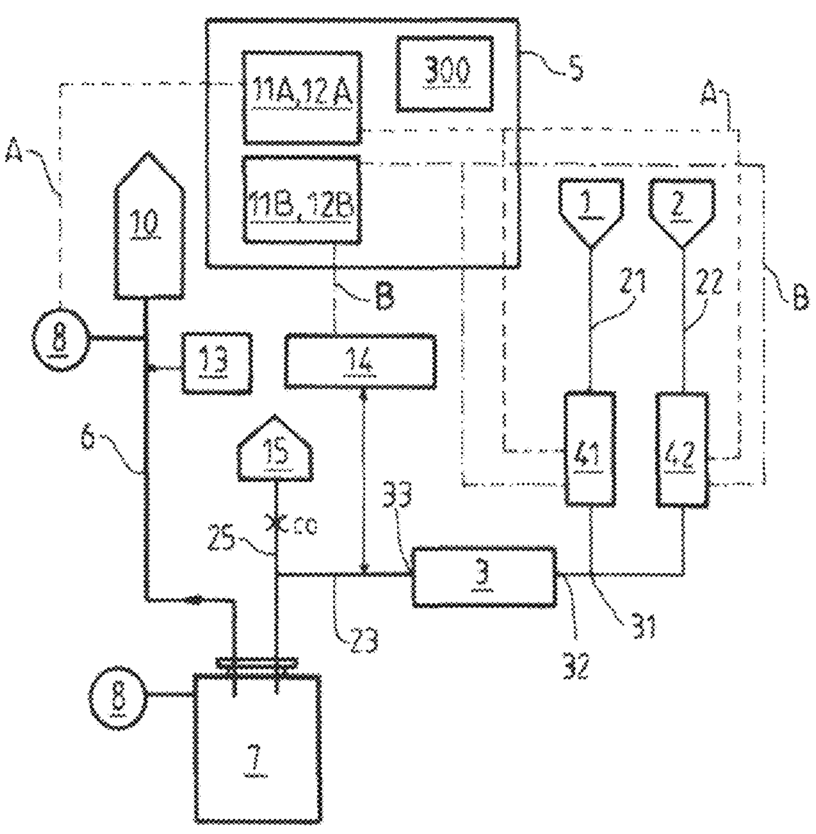
FIG. 1 schematically shows the operation of a plant according to one embodiment of the invention, FIG. 2 schematically shows a first feedback loop according to one embodiment of the invention.

FIG. 1 represents a plant according to the invention comprising a source of first gas 1 and a source of second gas 2. The first gas 1 and the second gas 2 are of different natures. They may be single or mixed pure substances, or premixes of several pure substances, in particular one pure substance diluted with another. Each of the gas sources may be a gas cylinder, typically a cylinder that may have a water volume of up to 50 L, a set of cylinders connected to one another to form a bundle of cylinders or a tank of greater capacity, in particular a capacity of up to 1000 L, such as a cryogenic storage tank or a tank arranged on a lorry trailer. Preferably, the sources deliver fluids in the gaseous state. Before delivery, the fluids may be stored in the gaseous state, in the liquid state, i.e. liquefied gases, or in the liquid/gas two-phase state.

FIG. 1 illustrates the case where the plant is configured to produce a binary gas mixture, i.e. containing two constituents, from two gas sources. Of course, a plant according to the invention could comprise more than two sources of gas and produce mixtures containing more than two constituents, in particular ternary or quaternary gas mixtures.

Each of the sources of first gas and of second gas is connected by a first line 21 and a second line 22 to respective first and second flow regulator members 41, 42. These are provided to regulate the flows of first gas and of second gas flowing towards the gas mixer device 3. Preferably, the lines 21, 22 join together at a connection point 31 located upstream of the mixer device 3 in order to form a shared line portion connected to an inlet 32 of the mixer device. A mixture of the first and second gases thus enters the device 3 in order to be further mixed and homogenized therein. Note that it can also be envisaged for the lines 21, 22 to each open into two separate inlets 32*a*, 32*b* of the mixer device 3.

Preferably, each of the lines 21, 22 is provided with a pressure-reducing valve and a pressure sensor in order to measure and control the pressure prevailing in these lines. The pressures of the first and second gases may each be kept constant, typically at a value between 1 and 10 bar.

Each flow regulator member 41, 42 may be any means configured to set, regulate, adjust the flow rate of a fluid in order to bring it to a flow rate value closest to the desired value.

Typically, the flow regulator members 41, 42 each comprise a flow sensor, or flowmeter, combined with an expansion member, such as a valve, for example a proportional control valve. The valves may be pneumatic or piezoelectric, analogue or digital. The valve comprises a moving part, typically at least one closure member, which is placed in the flow of fluid and the displacement of which makes it possible to vary the flow area, and thus to vary the flow in order to bring it to the setpoint value. In particular, the flow regulator members 41, 42 may be mass flow regulators comprising a mass flow sensor and a proportional control valve. Note that even if the regulation is based on a measurement of mass of fluid, the setpoint and measured flow values are not necessarily expressed by mass. Thus, a volume flow setpoint may be expressed as a percentage opening of the proportional control valve, to which a voltage value to be applied to the control valve of the regulated member corresponds. The conversion between percentage opening to mass or volume flow value is achieved by knowing the nominal value of the regulated flow for 100% opening.

According to one advantageous embodiment, the valve is piezoelectric. This type of valve offers great accuracy, good reproducibility enabling the monitoring of the voltage applied to the valve. Such valves are also relatively insensitive to magnetic fields and radio-frequency noise. Their energy consumption is low with minimal heat generation. The metal on metal control surface reduces, or even eliminates, reactions with the gas. Finally, owing to a relatively small flow control cavity volume, in particular compared to that of a solenoid valve, it is possible to have a rapid replacement of the gas and an excellent dynamic response.

In practice, the first and second flow regulator members 41, 42 make it possible to regulate, respectively, the flow of first gas and the flow of second gas entering the mixer 3 according to a first flow rate setpoint D1 and a second flow rate setpoint D2. At the outlet 33 of the mixer device 3 the gas mixture exits with a production flow rate DP which corresponds, in the case of a plant with two gas sources, to the sum of the two flow rates D1 and D2 of first and second gas. If the plant comprises for example a source of a third gas, the flow rate DP will be the sum of flow rates D1, D2, D3 regulated by corresponding flow regulator members 41, 42, 43 in the direction of the mixer device 3.

The plant according to the invention further comprises a control unit 5 which is connected to the first and second flow regulator members 41, 42 so as to control the operation thereof, in particular so as to adjust the setpoint values D1, D2 in order to bring them to values which are determined and suitable as a function of the operating conditions of the plant.

To do this, the flow regulator members 41, 42 each advantageously comprise a closed-loop system which is given flow setpoints by the control unit 5. These setpoints are then compared by the closed-loop system to values measured by the flow regulator members 41, 42 and the positions thereof are consequently adjusted by said system to send flows as close as possible to D1, D2 to the mixer device 3.

Advantageously, the control unit 5 comprises a programmable controller, also referred to as a PLC (Programmable Logic Controller) system, i.e. a control system for an industrial process comprising a man-machine interface for supervision and a digital communication network. The PLC system may comprise several modular controllers which control the control sub-systems or equipment of the plant. These pieces of equipment are each configured to ensure at least one operation from among: acquisition of data from at least one measurement sensor, control of at least one actuator connected to at least one flow control member, the regulation and feedback of parameters, the transmission of data between the various pieces of equipment of the system.

The control unit 5 may thus comprise at least one from among: a microcontroller, a microprocessor, a computer. The control unit 5 may be connected to the various pieces of control equipment of the plant, in particular to the flow regulator members 41, 42, to the sensor 8, and communicate with said piece of equipment by electrical, Ethernet, Modbus, etc. connections. Other modes of connections and/or transmission of information can be envisaged for all or some of the equipment of the plant, for example by radiofrequency, WIFI, Bluetooth, etc. connections.

Firstly, the electronic logic 5 calculates a predetermined proportion of the flow rate D1 relative to a production flow rate DP and/or a predetermined proportion of the flow rate D2 relative to DP, i.e. predetermined D1/DP and/or D2/DP ratios, as a function of a target content C1 of first gas in the gas mixture and/or of a target content C2 of second gas in the gas mixture.

Preferably, the electronic logic 5 does not perform a calculation of the second gas flow rate D2 from a target content C2 of second gas but sets D2 by deduction from D1. D2 then corresponds to DP from which D1 is subtracted. Preferably, the electronic logic 5 calculates a predetermined proportion of the flow rate D1 relative to DP from a target content C1 which is that of the minor gas of the mixture.

Note that for a ternary mixture for example, D1 and D2 will be able to be set from the respective target contents C1, C2, the third flow rate setpoint D3 of the third gas being deduced from the values of D1 and D2.

According to one possibility of implementation, the control unit 5 comprises a man-machine interface 300 comprising an input interface, for example a touch screen, enabling the input by a user of said at least one target content of the first gas and/or of the second gas in the gas mixture. For example, the contents may be expressed as a volume percentage of first gas or second gas present in the gas mixture. More generally, the man-machine interface 300 may enable the user to give instructions to the control unit 5.

The flow regulator members 41, 42 receive the order from the control unit 5 to regulate the flow of the first and second gases to the respective setpoints D1, D2 determined from the target composition for the gas mixture. It is with these flow rates that the first gas and the second gas enter the mixer device 3.

Typically, the mixer device 3 comprises a common mixer volume into which the inlet or inlets and the outlet 33 open and in which the mixture is homogenized. Use could for example be made of a mixer 3 of static mixer type enabling a continuous mixing of the fluids entering the mixer. This type of mixer generally comprises at least one disturbing element, such as a plate, a portion of pipe, an insert, capable of disturbing the flow of the fluids, generating pressure drops and/or turbulence in order to promote the mixing of the fluids and the homogenization thereof.

A mixture of the first and second gases is therefore produced at the outlet 33 of the mixer device 3 with a production flow rate DP. The flow rates D1 and D2 are governed by the flow rate DP and by the desired contents C1, C2 of first and second gases.

One problem that arises concerns the delivery of a gas mixture to a consuming unit 10 for which the demand for gas mixture fluctuates. It follows therefrom that the flow rate for conveying the gas mixture to point 10 will vary.

In order to adapt the flow rate of gas mixture produced at the outlet of the mixer device to the flow rate of gas consumed, the present invention proposes to connect the outlet 33 of the mixer 3 to the inlet of a buffer tank 7 via a line 23. A delivery line 6 is fluidically connected to an outlet of the buffer tank 7 and makes it possible, in operation, to deliver the gas mixture to the consuming unit 10.

Note that the plant may comprise a venting line 25 fluidically connected to the buffer tank 7 with a vent 15 linked to a relief valve, of use in the event of overpressure, and to a valve controlling the passage of the mixture to a gas reprocessing unit. The valve makes it possible, during phases of starting up the delivery to the consuming unit, to purge the lines of the plant and the buffer tank 7.

The delivery of the gas mixture to the consuming unit 10 therefore takes place from the buffer tank 7 with a consumption flow rate DC corresponding to the consumption of mixture of the consuming unit 10. If the flow rate DC varies during the operation of the delivery plant, the production flow rate DP upstream of the buffer tank 7 may no longer correspond to the demand for mixture. The buffer tank 7, owing to the supplementary volume that it provides to the fluid circuit, makes it possible to ensure a delivery at the flow rate DC even if it does not correspond to the flow rate DP. In particular, if DP is greater than DC, the tank 7 prevents the gas mixture from being forced towards the delivery line and thus absorbs the overproduction. And if DP is less than DC, the buffer tank 7 forms a reserve of mixture from which the user can draw on, for example when a consumption begins too rapidly with a high consumption flow rate, which makes it possible to ensure the delivery at the flow rate DC even in an underproduction situation.

Moreover, the plant comprises a measurement sensor 8 which measures a physical quantity, the variation of which is representative of a variation in the consumption flow rate DC flowing in the delivery line 6 and provides a corresponding first measurement signal to the control unit 5. In particular, the first measurement signal may comprise several successive measurements taken by the sensor 8. The unit 5 receives it and produces a first control signal which is transmitted to the flow regulator members 41, 42 so as to adjust the first flow rate setpoint D1 and the second flow rate setpoint D2 in accordance with the first control signal.

The present invention thus makes it possible to recalculate the flow rate setpoints D1, D2 set initially in order to adapt them to a variation in the consumption flow rate DC and therefore to the demand of the user. The mixer device 3 produces a mixture flow rate, the control of which is associated with the flow rate consumed.

Note that at the same time, the control unit 5 continues to monitor the D1/DP and D2/DP ratios so that they are in accordance with the contents of first gas and second gas desired for the gas mixture.

The process according to the invention advantageously implements a start-up phase during the start of a consumption of mixture by the consuming unit, when no consumption was detected before. During this start-up phase, there is a change from a zero production flow rate DP to a production of a mixture of first and second gases with a predetermined production flow rate DP.

In practice, in the start-up phase, the user can start up the production of gas mixture with a predetermined flow rate DP which can be set to a minimum "start-up" value corresponding to a predetermined percentage of the maximum production flow rate that can be produced. This maximum production flow rate corresponds to the sum of a first maximum flow rate value and of a second maximum flow rate value that the first and second regulator members 41, 42 are designed to deliver. Advantageously, the predetermined percentage is at least 25%, preferably at least 35% and more preferably at least 50% of the maximum production flow rate. This makes it possible to use the sensor which measures the D1, D2 flow regulators in its optimal and most accurate operating range.

Note that before delivering the mixture to the consuming unit 10, the gas mixture produced can be delivered to the vent 15, in the case in particular where the composition of the mixture might not comply with the target composition.

The user may optionally first set a higher production flow rate than the expected consumption flow rate DC in order to fill the buffer tank 7 and constitute a reserve of mixture therein.

After the start-up phase of the consumption, a phase of regulating the production follows during which the production flow rate DP is adjusted as a function of the consumption flow rate DC. During the regulating phase, the control unit 5 monitors the consumption flow rate DC via the measurements received from the measurement sensor 8. If a change in the consumption flow rate DC is detected, the control unit 5 produces a first control signal to adapt the flow rates D1, D2 delivered upstream of the mixer in order to bring the flow rate DP into line with the modified flow rate DC.

Preferably, the measurement sensor 8 takes measurements continuously or quasi-continuously. Preferably, the control unit 5 is configured so that the production of the first control signal and/or the transmission of the first control signal to the flow regulator members only takes place at a predetermined time interval, in particular an interval of the order of 1 to 60 seconds. In other words, the flow rate setpoints are maintained during this time interval, without an adjustment of the setpoints being ordered by the control unit 5. This makes it possible to prevent a reaction of the plant following inadvertent fluctuations of the flow rate DC or else to avoid generating excessively rapid variations of the flow rate DP which could give rise to operating errors.

Optionally, depending on the amplitude and/or the speed of variation of the flow rate DC, the control unit 5 may be configured to, at least temporarily, maintain the production flow rate DP. For example, if the consumption flow rate DC increases, the consuming unit connected to the consuming unit 10 may draw on the buffer tank 7 to compensate for the underproduction of the mixer 3. If the consumption flow rate DC decreases, the buffer tank 7 may fill up to absorb the overproduction of the mixer 3.

Preferably, the control unit 5 is configured so as to stop the gas streams when the physical quantity measured by the sensor 8 is representative of a zero consumption flow rate DC. Thus, in the absence of demand, the plant does not produce a gas mixture. The control unit 5 may also be configured to stop the gas streams if the physical quantity measured by the sensor 8 is representative of a low consumption flow rate DC, i.e. lower than a given low flow rate threshold, in order to avoid overpressure in the buffer tank 7. The control unit 5 may also be configured to generate an alarm signal when the physical quantity measured by the sensor 8 is representative of a consumption flow rate DC above a given high flow rate threshold.

Advantageously, the plant according to the invention uses a first feedback loop from the first and second flow rate setpoints D1, D2 to the first measurement signal. A "feedback loop" is generally understood to mean a system for monitoring a process in which a regulating quantity acts on a regulated quantity, i.e. a quantity to be fed back, in order to bring it as quickly as possible to a setpoint value and maintain it thereat. The basic principle of a feedback is to measure, continuously, the difference between the actual value of the quantity to be fed back and the setpoint value that it is desired to achieve, and to calculate the appropriate command to apply to one or more actuators so as to reduce this difference as quickly as possible. It is also referred to as a closed-loop controlled system.

In the first feedback loop, the regulating quantity is the physical quantity measured by the measurement sensor 8, the regulated quantity is the production flow rate DP, via the adjustment of the flow rates D1 and D2 of first and second gases. The setpoint is variable depending on the conditions for consumption of the mixture.

Besides the sensor 8, the first feedback loop comprises a first comparator 11A arranged within the control unit 5 and configured to produce at least a first error signal from the first measurement signal. The first error signal may be representative of a variation in the physical quantity measured. It is advantageously obtained by comparison with at least one measurement of said physical quantity carried out at another instant.

Furthermore, the first feedback loop comprises a first corrector 12A arranged within the control unit 5 and configured to produce the first control signal from the first error signal.

The first corrector 12A sends the control signal to actuators which control a movement, in response to the first control signal, of the first and second flow regulator members 41, 42 into respective positions in which the first flow rate setpoint D1 and the second flow rate setpoint D2 are adjusted in accordance with the first control signal. Typically, the actuators control the movement of the moving parts within the regulator members, which vary the flow rates D1, D2 sent to the mixer device 3 in a direction that tends to reduce the difference between the flow rates DP and DC.

Preferably, the first corrector 12A is of proportional, integral and derivative (PID) type, which makes it possible to improve the performance of a feedback owing to three combined actions: a proportional action, an integral action, a derivative action.

Preferably, and as mentioned above, the corrective action of the first feedback loop is only applied to the setpoints D1, D2 at a predetermined time interval, preferably an interval between 1 and 60 s, more preferably of the order of 20 s, in order to prevent excessively rapid variations of the production flow rate which may create errors. This time interval may be a parameter of the first corrector 12A.

The first corrector 12A may in particular comprise a microprocessor, memory registers, programming instructions for processing the first error signal and producing, by numerical calculation, the proportional, integral and derivative terms of the feedback loop. These terms, which may be determined by calculation and/or experimentally, are combined to provide the control signal for the regulator members 41, 42. The derivative term may optionally be zero.

FIG. 1 illustrates an embodiment in which the measurement signal is obtained by a flow rate sensor 8, also referred to as a flowmeter, arranged on the delivery line 6 so as to directly measure the consumption flow rate DC delivered to the consuming unit 10. The signals received and sent to the various elements of the plant are shown schematically by the dashed lines referenced "A".

Typically, if the flow rate DC increases, the control signal orders an increase of the first and second flow rate setpoints D1, D2 and a decrease of the first and second flow rate setpoints D1, D2 if the flow rate DC decreases.

Note that in the context of the invention, each of the first and second flow regulator members 41, 42 can be moved between a closed position in which the first flow rate setpoint D1 or the second flow rate setpoint D2 is zero and a completely open position in which the first flow rate setpoint D1 or the second flow rate setpoint D2 respectively have a first maximum flow rate value or a second maximum flow rate value.

The first and second flow regulator members 41, 42 may optionally occupy at least one intermediate position between the closed position and the open position. Preferably, said intermediate position corresponds to a first flow rate setpoint D1 or a second flow rate setpoint D2 greater than or equal to a first minimum flow rate value or a second minimum flow rate value. Preferably, the first minimum flow rate value and/or the second minimum flow rate value is equal to at least 25%, more preferably at least 35%, or at least 50%, of the respective first or second maximum value. This makes it possible to work in flow rate ranges where the accuracy of the regulator members 41, 42, more specifically the accuracy of the flow rate sensors used in the regulator members, is better.

According to one embodiment variant, the plant uses a pressure sensor 8 that measures the pressure prevailing in the buffer tank 7 as a physical quantity representative of the consumption flow rate DC. The fluctuations in consumption flow rate DC are thus determined indirectly, via the determination of the pressure fluctuations in the buffer tank 7. The representation from FIG. 1 remains applicable except that the measurement signal is produced by the sensor 8 connected to the buffer tank and not by the sensor 8 connected to the line 6.

Note that the plant according to the invention may comprise two sensors 8, one a flow rate sensor and the other a pressure sensor. These sensors are as described above and each produce a respective first measurement signal. Depending on the predetermined choice criteria, the control unit 5 is configured to produce the first control signal from the measurement signal originating from one or other of the sensors 8. Preferably, the control unit 5 chooses to use the first measurement signal originating from the one of the two measurement sensors 8 that measures a physical quantity value representative of the highest flow rate.

In practice, if the flow rate DC to the consuming unit 10 increases, the production flow rate DP produced at the outlet of the mixer device 3 will begin to become insufficient. The consuming plant connected to the consuming unit 10 will draw on the buffer tank 7 to compensate for the underproduction of the mixer 3, leading to a decrease of the pressure in the tank 7.

The pressure sensor 8 sends the first measurement signal to the first comparator 11A which produces a first error signal corresponding to the pressure drop information and transmits it to the first corrector 12A so that it calculates a first control signal applied to the first and second flow regulator members 41, 42 so that the first and second flow rate setpoints D1, D2 increase by an appropriate factor, which may be determined by the first control loop.

According to one embodiment possibility, the first comparator 11A is configured to produce at least a first error signal from a comparison of the first measurement signal with at least one parameter chosen from: a low pressure threshold, a high pressure threshold. These thresholds may be adjusted as a function of the operating conditions, of the characteristics of the plant, etc. When the pressure in the buffer tank 7 reaches the low pressure threshold, the first corrector orders the flow regulator members to regulate the flow of the first and second gases according to given flow rate setpoints D1, D2.

This operating mode may be used during the regulating phases and also during the start-up phases of the consumption. In the case of a start-up phase, as soon as the pressure in the buffer tank 7 reaches the low pressure threshold, the flow regulator members are ordered to regulate the flow of the first and second gases so as to produce the gas mixture with the flow rate DP set at the start-up value. In particular, the flow rate setpoints D1, D2 may correspond respectively to the first minimum flow rate value and the second minimum flow rate value. The flow regulator members 41, 42 each begin to produce minimum flow rates leading to a flow rate DP equal to the start-up value until the high pressure threshold in the buffer tank 7 is attained.

According to one possibility, if the pressure in the tank 7 does not increase sufficiently, in particular if the high pressure threshold is not attained, or if the pressure does not increase rapidly enough, the flow rate setpoints D1, D2 are increased by following a scheme of regulation by the first corrector 12A, preferably of PID type, in which the increase in the flow rates is a function of the drop in pressure.

If the pressure in the tank 7 attains the high pressure threshold, the flow regulator members 41, 42 may be moved towards their respective closed positions in which the flow rates D1, D2 are zero.

Figure 2:
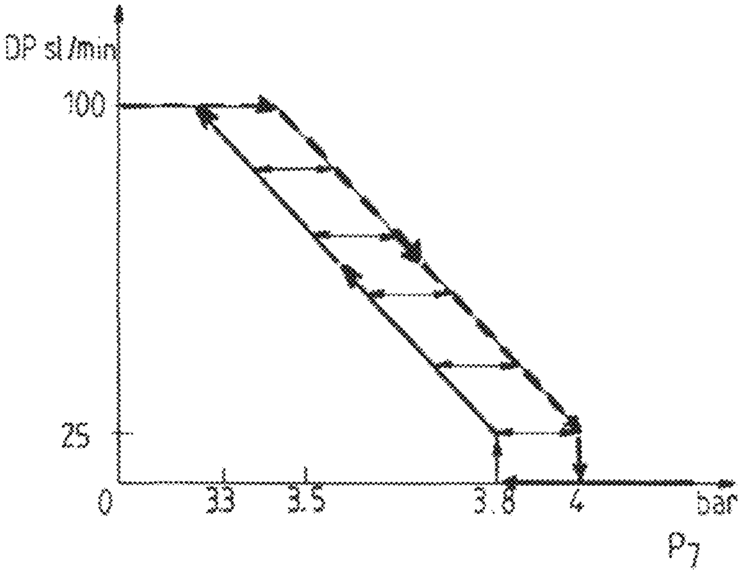

FIG. 2 schematically shows an example of the effect of a first feedback loop with a first corrector of PID type in which the production flow rate DP, corresponding to the sum of D1 and D2, is corrected as a function of the variation of the pressure P7 in the buffer tank 7. The maximum production flow rate DP of the plant, corresponding to the sum of the first and second maximum flow rate values, is set at 100 sL/min (standard litres per minute), i.e. 6 Nm3/h (normal cubic metres per hour). The minimum production flow rate DP of the plant, corresponding to the sum of the first and second minimum flow rate values, is set at 25 sL/min (standard litres per minute), i.e. 1.5 Nm3/h. The high and low pressure thresholds are set respectively at 4 bar and 3.8 bar.

FIG. 2 schematically represents various scenarios which may be encountered during the operation of the plant. If DP=DC, the pressure remains stable at 4 bar (grey arrow on the bottom right of FIG. 2). Subsequently, assuming that DC>0 but DP=0, the pressure in the buffer tank will drop to 3.8 bar (displacement to the left along the grey arrow). This pressure is the start-up pressure of the flow regulators. The flow rate DP is at its minimum start-up value, i.e. 25 sL/min. As soon as the control unit has ordered the flow regulators to produce a flow rate DP<DC, the pressure will drop until a DC flow rate equal to the maximum DP flow rate of the plant, i.e. 100 sL/min, is attained (upwards displacement along the grey arrows). As soon as DC decreases, i.e. DP>DC, the buffer tank begins to fill up and the pressure increases from 3.5 bar to 4 bar (by following the arrows with black dashes). 4 bar is the pressure at which filling of the buffer tank stops.

Figure 3:
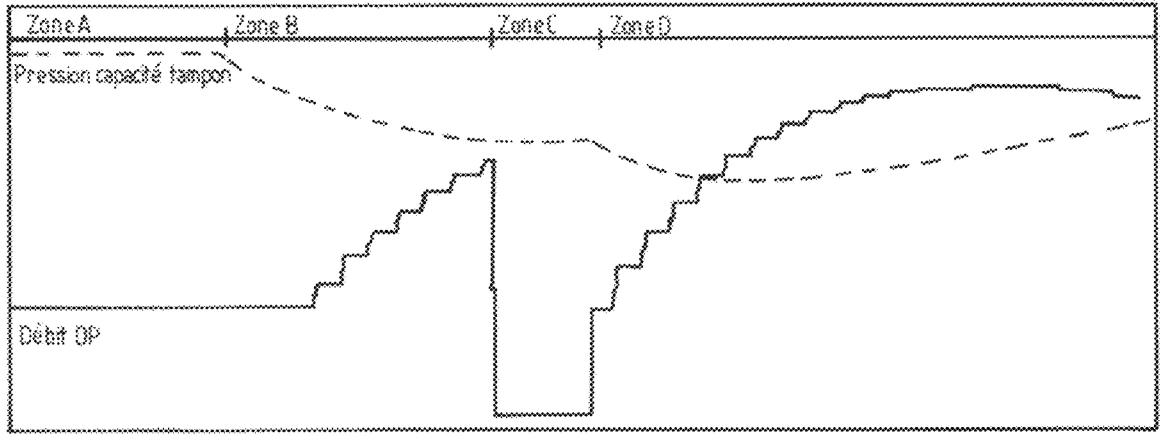
FIG. 3 represents an example of the change over time of the pressure prevailing in the buffer tank and of the production flow rate of the plant.

An example of what happens in practice is represented in FIG. 3 showing the change over time of the pressure prevailing in the buffer tank (dashed curve) and of the production flow rate DP (solid-line curve). At the start of the graph (zone A), if there is no drop in the pressure, the flow rate setpoint remains at 0. As soon as the pressure drops (zone B), flow rate setpoints are given to the flow regulators D1 and D2, which are increased by increments at a regular interval if the pressure does not stabilize. As soon as the pressure is stabilized, the buffer tank stops being filled (zone C). If the pressure drops again (zone D), the setpoints of the flow regulators will be adjusted to the desired values in order to make it possible to provide the consumption DC and to keep the pressure of the buffer tank stable.

It should be noted that the normal cubic metre is a unit for measuring the amount of gas which corresponds to the content of a volume of one cubic metre, for a gas that is under normal temperature and pressure conditions (0° C. or 15° C. or less commonly 20° C. depending on the frames of reference and 1 atm, i.e. 101 325 Pa). For a pure gas, one normal cubic metre corresponds to around 44.6 mol of gas.

Note that the buffer tank advantageously has an internal volume equal to at least half of the maximum production flow rate DP of the plant.

$$\text{Minimum buffer volume} = \frac{DP_{max}}{2}$$

Complying with this minimum internal volume makes it possible to absorb the pressure variations linked to the inadvertent nature of DC. The buffer tank may have an internal volume of at least 1 L, or at least 50 L, or even 1000 L or more. Preferably, the internal volume of the buffer tank will be between 50 and 400 L. The tank may be formed of a single tank or several tanks fluidically connected to one another, the internal volume of the buffer tank then being understood as the sum of the volumes of the tanks.

As seen in FIG. 1, the plant may further comprise a first analysis unit 13 configured to analyse at least one content of first gas and/or second gas in the gas mixture delivered by the supply line 6. This makes it possible in particular, during the start-up phase of the plant, to condition the delivery of the gas mixture so that the measured contents comply with the target contents. A tolerance of the order of from 0.1% to 5% (relative %) relative to the target contents C1, C2 may be set. If the mixture produced does not comply, the production may optionally be stopped. Preferably, the first analysis unit 13 is configured to analyse the content of first gas, which may in particular be the minor gas in the gas mixture. Furthermore, the plant according to the invention may comprise a second analysis unit 14 arranged upstream of the buffer tank 7 so as to measure at least one content of first gas and/or second gas in the gas mixture produced by the mixer device 3. The second analysis unit 14 is configured to consequently provide at least a second measurement signal destined for the control unit 5, which produces a second control signal from the second measurement signal. The second control signal is used to control one and/or the other of the flow regulator members 41, 42 so as to adjust one and/or the other of the proportions of the first flow rate setpoint D1 and of the second flow rate setpoint D2 relative to the production flow rate DP so that the actual composition of the gas mixture leaving the mixer device 3 approaches the target composition with contents C1, C2 (C2 preferably being deduced from C1 and not measured). The signals received and sent to the various elements of the plant within the context of control of the composition of the mixture are shown schematically by the dashed lines "B".

This control of the contents of the mixture produced by the mixer device makes it possible to compensate for possible errors between the flow rates actually regulated by the flow regulator members 41, 42 and the flow rate setpoints D1, D2 which are applied thereto. The arrangement of a sampling point located between the outlet of the mixer device and the inlet of the buffer tank 7 makes it possible to detect and to react more rapidly to possible variations in contents, thus avoiding the risk of consuming a non-compliant mixture in the buffer tank 7.

Note that the line that samples the mixture and conveys it to the analysis unit advantageously has the shortest possible length so that the analyser provides a very accurate response in real-time or in virtually real-time. Preferably, the line is such that the interval between the moment when the mixture is sampled at its sampling point and the moment when the analysis unit gives its measurement is minimal, typically less than 30 seconds, in particular between 1 and 30 seconds.

Preferably, the second control signal is produced from a second error signal containing at least one piece of information on the difference between a measured content and a target content, for the first gas or the second gas. Preferably, only the content of the first gas is measured and compared to its target value, the first gas being the minor gas of the mixture. This difference may in particular be expressed as:

$$\Delta C_1 = \frac{M_1 - C_1}{C_1}$$

where M1 is the content measured for the first gas. The relative difference ΔC1 may be used as a correction factor for the first flow rate setpoint D1.

Consider the example of a plant configured to produce a mixture of two gases with a production flow rate DP at the outlet of the mixer device 3 of 100 sL/min. The desired gas mixture is a mixture formed of the first gas with a target content C1 of 4% and of the second gas for the remainder, therefore with a content C2 of 96% (volume %). A first flow rate setpoint D1 of 4 sL/min (0.24 Nm3/h), corresponding to a proportion of 4% relative to DP, and a second setpoint D2 of 96 sL/min (5.76 Nm3/h), corresponding to a proportion of 96% relative to DP, are therefore applied to the respective flow regulator members 41, 42. A control accuracy of the members 41, 42 of plus or minus 1% is assumed. Take the example of an error of −1% in D1 and of +1% in D2. This results in an actual flow rate of first gas equal to 3.96 sL/min, in an actual flow rate of second gas equal to 96.96 sL/min and in an actual production flow rate of 100.92 sL/min. A first gas content of 3.92% is measured at the outlet of the mixer device 3, corresponding to a difference ΔC1 of −2% (relative %) relative to the target content C1. The control unit 5 produces a second control signal ordering, at the flow regulator members 41, 42, an adjustment of the flow rate proportions D1 and D2 relative to DP so as to compensate for this difference. The first setpoint D1 is therefore adjusted to D1+2%, i.e. 4.08 sL/min.

Preferably, only the first setpoint D1 is adjusted as a function of the second measurement signal, the control unit 5 controlling the maintenance of D2. It being understood that it can be envisaged for D2 to also be adjusted in response to the second control signal. In the example above, D2 would be adjusted to 95.04 sL/min. Note that the correction may also be performed by the application of a correction factor to at least one of the target contents recorded beforehand in the control unit 5, in the example above a correction by a factor equal to 0.03%, which has the effect of consequently adjusting D1 to 4.08 sL/min.

Optionally, the plant may comprise an alarm configured to emit an alarm signal if the first analysis unit and/or the second analysis unit detects contents outside of the anticipated tolerance ranges.

The first analysis unit 13 and/or the second analysis unit 14 may be chosen in particular from the following types of detectors: a thermal conductivity detector, a paramagnetic alternating pressure detector, a catalytic adsorption detector, a non-dispersive infrared absorption detector, an infrared spectrometer. The type of analysis unit will be able to be adapted depending on the nature of the gases to be analysed. The first 13 and second 14 analysis units could optionally be swapped around. Preferably, the first 13 and second 14 analysis units are connected to the vent 15 so as to evacuate the analysed gas mixture there.

According to one embodiment, the plant may comprise a second feedback loop from the respective proportions of the first flow rate setpoint D1 and/or the second flow rate setpoint D2 relative to the production flow rate DP to the second measurement signal provided by the second analysis unit 14.

In the second feedback loop, the regulating quantities are the content(s) measured by the second analysis unit 14, and the regulated quantities are one and/or the other of the proportions D1/DP, D2/DP. The setpoint is variable depending on the actual content(s) measured.

The second loop comprises a second comparator 11B arranged within the control unit 5 and configured to produce at least a second error signal from a comparison of the second measurement signal with at least one parameter chosen from: the target content C1 of the first gas, the target content C2 of the second gas. A second corrector 12B is arranged within the control unit 5, in particular of PID type, and configured to produce the second control signal from the second error signal. In response to the second control signal, the actuators of the first and second flow regulator members 41, 42 order the movement of the first and second flow regulator members 41, 42 into respective positions in which the proportions of D1 and/or D2 relative to DP comply with the second control signal. Preferably, only the proportion of D1 is adjusted, the control loop ordering D2 to remain fixed.

Note that the first comparator and the second comparator may optionally form one and the same entity configured to receive, as input data, both the measurements from the sensor 8 and from the second analysis unit 14 and to produce, as output, the appropriate error signals. The same is true for the first and second correctors.

The plant according to the invention may be used for delivering gas mixtures used in various industries such as the semiconductor, photovoltaic, LED and flatscreen industries or any other industry such as the mining, pharmaceutical, space or aeronautical industries.

Preferably, the plant comprises at least one gas cabinet, installed in which are at least the control unit 5, the mixer device 3, the flow regulator members, the measurement sensor 8, the buffer tank 7. The sources of first and second gases may be located in or outside of the cabinet. Preferably, the sources are located outside of the cabinet so that this cabinet retains a reasonable footprint. Preferably, the control unit 5 is arranged outside of the cabinet, either by being fixed to one of the walls of the cabinet, or positioned at a distance from the cabinet.

The gas cabinet may comprise a housing with a rear wall, side walls, a front wall, a base and a ceiling. In the housing, one or more buffer tanks are provided which stand on the base and may be fixed in the housing in a manner known in the prior art. A system of gas ducts is arranged in said housing, preferably against the base of the cabinet. The cabinet may comprise means for controlling and/or maintaining the system of gas ducts such as valves, pressure-reducing valves, pressure measurement members, etc., making it possible to carry out operations such as delivery of gas, opening or closing of certain ducts or portions of ducts, management of the gas pressure, performing of purge cycles, leak tests, etc.

The housing comprises gas inlet openings for a supply with the first and second gases and a gas outlet opening for delivering the gas mixture. The delivery line 6 is connected to the outlet opening. In operation, the gas cabinet is connected to the consuming unit by the delivery line 6. Other gas inlets may be provided, in particular for a purging gas or a gas standard for calibrating the analysers.

The plant according to the invention may particular be used to produce gas mixtures having the following compositions:

- hydrogen ($H_2$) in an inert gas such as nitrogen ($N_2$), argon or helium,
- helium in an inert gas such as nitrogen or argon,
- carbon dioxide ($CO_2$) in an inert gas such as nitrogen, argon or helium,
- methane ($CH_4$) in an inert gas such as nitrogen, argon or helium,
- oxygen ($O_2$) in an inert gas such as nitrogen, argon or helium.

Preferably, the target contents C1 of first gas, in particular the target contents of H2, helium, CO2, CH4, O2, are between 0.0001% and 50%, preferably between 0.1% and 20%, the remainder being the second gas.

In order to demonstrate the effectiveness of a plant according to the invention, the production and delivery on site of a mixture comprising hydrogen as first gas in nitrogen as second gas were carried out. The target content C1 of hydrogen was 4% (% by volume). The plant comprised a first feedback loop of PID type as described above and optionally, according to the accuracy requirements demanded by the consuming unit, a second feedback loop.

Figure 4:
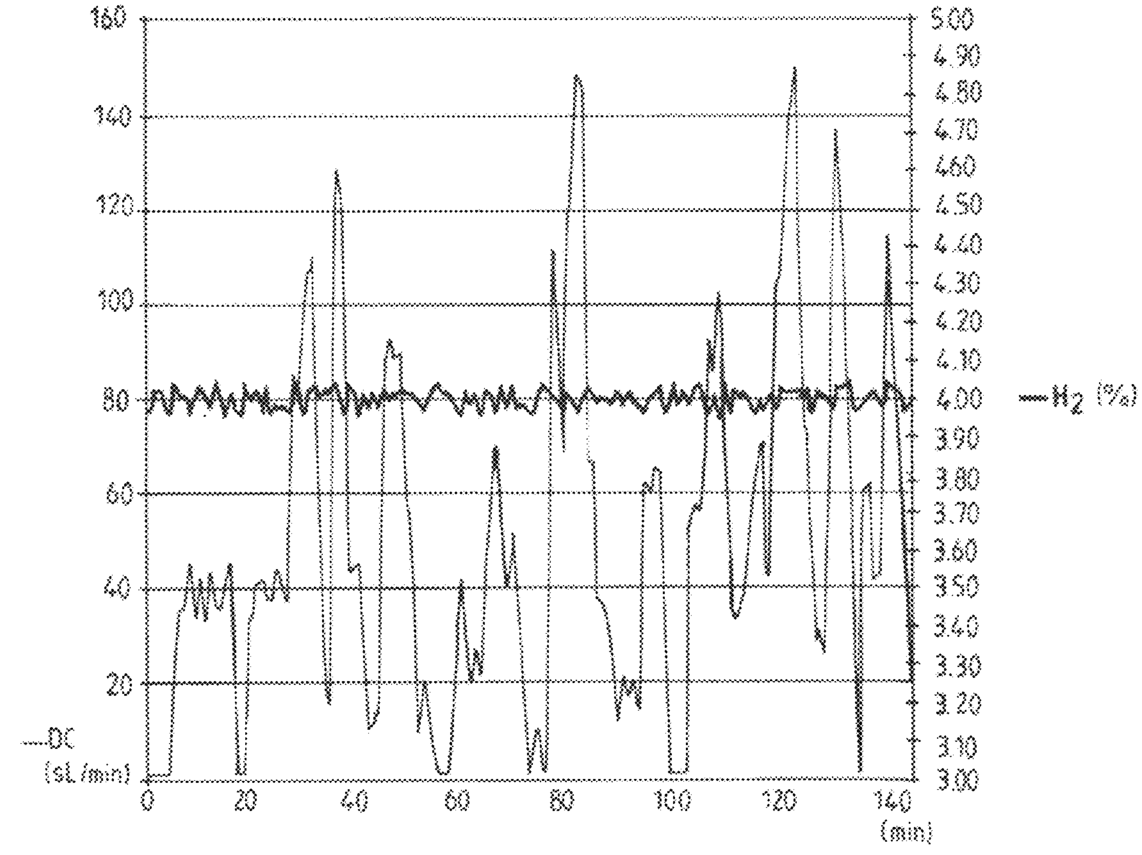
FIG. 4 represents an example of the change overtime of the flow rate of the gas mixture delivered by a plant according to one embodiment of the invention with the content of a constituent of the mixture measured during this change.

FIG. 4 shows a recording of the gas mixture flow rate DC delivered by the delivery line of a plant comprising a second feedback loop with the hydrogen content which are measured during this recording.

Figure 5:
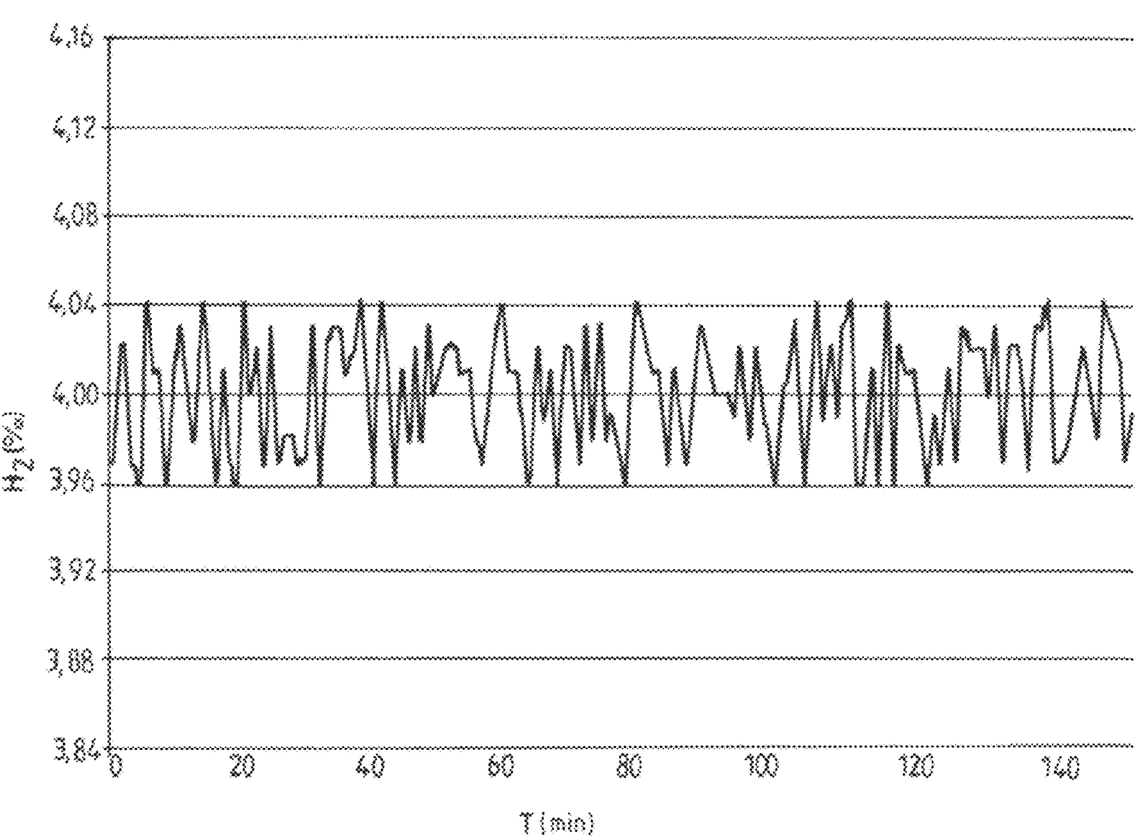
FIG. 5 represents an enlargement of the curve relating to the content measured from FIG. 4.

FIG. 5 is an enlargement of the recording of the content in FIG. 4.

A gas mixture flow rate DC that varies typically between 0 and 150 sL/min was able to be produced with a stability of the content that is characterized by a relative standard deviation of the order of 3% without a second feedback loop and of the order of 1% with a second feedback loop.

It should be noted that the present description describes a gas mixture containing two constituents but that it can be transposed to any mixture having a greater number of constituents. For example, in the case of a ternary gas mixture, three sources each deliver a first gas, a second gas and a third gas. Flow regulator members 41, 42, 43 receive the order from the control unit 5 to regulate the flow of the first gas, second gas and third gas to respective flow rate setpoints D1, D2, D3. The mixer device is configured to deliver a mixture of flow rate DP equal to the sum of D1, D2, D3. The proportions of first gas, second gas and third gas relative to DP are determined as a function of at least two out of three target contents C1, C2, C3 of first gas, second gas and third gas respectively in the gas mixture. All or some of the characteristics already described for a mixture containing two gases can be transposed to this mixture containing three or more gases.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A plant for delivering a gas mixture comprising:
- a source of a first gas,
- a source of a second gas,
- a mixer device fluidically connected to the source of first gas and to the source of second gas, said mixer device being configured to produce, at an outlet, a gas mixture comprising the first gas and the second gas,
- a first flow regulator member and a second flow regulator member which are configured to regulate respectively the flow of the first gas and the flow of the second gas flowing towards mixer device according to a first flow rate setpoint and a second flow rate setpoint defining, in operation, a production flow rate of the gas mixture at the outlet of the mixer device,
- a control unit configured to control the first and second flow regulator members so as to adjust the first flow rate setpoint and the second flow rate setpoint in respective proportions relative to the production flow rate, said respective proportions being determined as a function of at least one target content of first gas and/or second gas in the gas mixture,
- a buffer tank fluidically connected to the outlet of the mixer device on the one hand and to a delivery line on the other hand, the delivery line being configured to deliver the gas mixture to a consuming unit with a consumption flow rate representative of a variable consumption of the gas mixture,
- at least one measurement sensor configured to measure a physical quantity, the variation of which is representative of a variation in the consumption flow rate delivered by the delivery line and to provide a first measurement signal of said physical quantity, the control unit being connected to the measurement sensor and configured to produce a first control signal from the first measurement signal, the flow regulator members being configured to adjust the first flow rate setpoint and the second flow rate setpoint in response to said first control signal.

2. The plant according to claim 1, further comprising a first feedback loop from the first and second flow rate setpoints to the first measurement signal provided by the measurement sensor, said first loop comprising:
- a first comparator arranged within the control unit and configured to produce at least a first error signal from the first measurement signal,
- a first corrector arranged within the control unit, and configured to produce the first control signal from the first error signal,
- actuators of the first and second flow regulator members which are connected to the first corrector and configured to receive the first control signal and to move the first and second flow regulator members into respective positions in which the first flow rate setpoint and the second flow rate setpoint comply with the first control signal.

3. The plant according to claim 1, wherein the measurement sensor comprises a flow sensor or flowmeter configured to measure the consumption flow rate.

4. The plant according to claim 2, wherein the first comparator is configured to produce at least a first error signal representative of a variation in the consumption flow rate and the first corrector is configured to produce a first control signal controlling a movement of the first and second flow regulator members so that the first and second flow rate setpoints vary in the same direction as that of the variation in the flow rate.

5. The plant according to claim 1, wherein the measurement sensor comprises a pressure sensor configured to measure the pressure prevailing in the buffer tank.

6. The plant according to claim 2, wherein the first comparator is configured to produce a first error signal representative of a variation in the pressure in the buffer tank and the first corrector is configured to produce at least a first control signal controlling a movement of the first and second flow regulator members so that the first and second flow rate setpoints vary in the opposite direction to that of the variation in the pressure.

7. The plant according to claim 5, wherein a first comparator is configured to produce at least a first error signal from a comparison of the first measurement signal with at least one parameter chosen from: a low pressure threshold, a high pressure threshold.

8. The plant according to claim 2, wherein each of the first and second flow regulator members can be moved between a closed position in which the first flow rate setpoint or the second flow rate setpoint is zero and a completely open position in which the first flow rate setpoint or the second flow rate setpoint respectively have a first maximum flow rate value or a second maximum flow rate value, the first and second flow regulator members occupying at least one intermediate position between the closed position and the open position with said intermediate position corresponding to a first flow rate setpoint or a second flow rate setpoint equal to at least 25 of the respective first or second maximum value.

9. The plant according to claim 1, wherein the buffer tank has an internal volume equal to at least half of the maximum production flow rate of the plant.

10. The plant according to claim 1, further comprising a first analysis unit arranged downstream of the buffer tank and configured to analyse at least one content of first gas and/or second gas in the mixture delivered by the supply line.

11. The plant according to claim 10, further comprising a second analysis unit configured to measure at least one content of first gas and/or second gas in the gas mixture produced at the first outlet of the mixer device and to consequently provide at least a second measurement signal, the control unit being connected to the second analysis unit and configured to produce a second control signal from the second measurement signal and to modify the proportion of the first flow rate setpoint and/or the proportion of the second flow rate setpoint relative to the production flow rate in response to said second control signal.

12. Plant according to claim 2, further comprising a second feedback loop from the respective proportions of the first flow rate setpoint and/or the second flow rate setpoint relative to the production flow rate to the second measurement signal provided by the second analysis unit, the second loop comprising:

a second comparator arranged within the control unit and configured to produce at least a second error signal from a comparison of the second measurement signal with at least one parameter chosen from: a target content of the first gas, a target content of the second gas, a second corrector arranged within the control unit and configured to produce the second control signal from the second error signal, actuators of the first and/or second flow regulator members being connected to the second corrector and configured to move the first and/or second flow regulator members into respective positions in which the proportions of the first flow rate setpoint) and/or second flow rate setpoint relative to the production flow rate comply with the second control signal.

13. The plant according to claim 1, wherein the control unit comprises a man-machine interface comprising:

an input interface, in particular a touch screen, configured for the input by a user of at least one target content of the first gas and/or of the second gas in the gas mixture, at least one calculation rule in order to calculate, from said target content, the predetermined proportions of first flow rate setpoint and/or second flow rate setpoint relative to the production flow rate.

14. An assembly for delivering gas mixture comprising a plant according to claim 1 and a consuming unit consuming said gas mixture, said plant and said consuming unit being fluidically connected via the delivery line.

15. A process for delivering a gas mixture comprising the following steps:

a) passing the first gas into a first flow regulator member thereby delivering the first gas with a first flow rate setpoint to a mixer device, b) passing a second gas into a second flow regulator member thereby delivering the second gas with a second flow rate setpoint to the mixer device, c) producing, via an outlet of the mixer device, a gas mixture comprising the first gas and the second gas with a production flow rate, d) adjusting, via control of the first and/or second flow regulator members, the first flow rate setpoint and the second flow rate setpoint in respective proportions relative to the production flow rate, said respective proportions being determined as a function of at least one target content of first gas and/or second gas in the gas mixture, e) introducing, via a buffer tank, the mixture produced in step d) into a delivery line and delivering the gas mixture to a consuming unit with a consumption flow rate representative of a variable consumption of the gas mixture, f) measuring a physical quantity, the variation of which is representative of a variation in the consumption flow rate delivered by the delivery line, g) producing, from the first measurement taken in step f), at least a first measurement signal and adjusting, by control of the first and second flow regulator members, the first flow rate setpoint and the second flow rate setpoint as a function of said first measurement signal.

* * * * *